(12) United States Patent  
Haupt et al.

(10) Patent No.: US 9,201,454 B2  
(45) Date of Patent: Dec. 1, 2015

(54) MOLDING A DISPLAY SCREEN INTO A HOUSING OF AN ELECTRONIC DEVICE

(71) Applicant: Motorola Mobility LLC, Libertyville, IL (US)

(72) Inventors: Eric Haupt, Round Lake Beach, IL (US); Joseph L. Allore, Mundelein, IL (US); Michael Formenti, Channahon, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/082,733

(22) Filed: Nov. 18, 2013

(65) Prior Publication Data

US 2014/0368981 A1 Dec. 18, 2014

Related U.S. Application Data

(60) Provisional application No. 61/836,464, filed on Jun. 18, 2013.

(51) Int. Cl.
*G02F 1/1333* (2006.01)
*G06F 1/16* (2006.01)
*G02F 1/1335* (2006.01)

(52) U.S. Cl.
CPC ........ *G06F 1/1626* (2013.01); *G02F 1/133308* (2013.01); *G02F 1/133608* (2013.01)

(58) Field of Classification Search
CPC ..................... G02F 1/133308; G02F 1/133608
See application file for complete search history.

(56) References Cited

U.S. PATENT DOCUMENTS

| 6,382,448 B1 | 5/2002 | Yuhara et al. |
| 7,401,758 B2 | 7/2008 | Liang et al. |
| 2014/0285967 A1* | 9/2014 | Wikander et al. ........ 361/679.54 |

* cited by examiner

*Primary Examiner* — Phu Vu
(74) *Attorney, Agent, or Firm* — Wolfe-SBMC

(57) ABSTRACT

Arrangements described herein relate to molding of a display screen into a housing of an electronic device. Ad adhesive can be applied to a side of a plastic film to form an adhesion member. The adhesion member can be connected to the display screen, the adhesive bonding to the plastic film to a peripheral region of the display screen. The display screen with the connected adhesion member can be inserted into a housing mold. Plastic resin can be injected into the housing mold to form a housing of the electronic device, the plastic film bonding with the injected plastic resin to secure the display screen into the housing.

16 Claims, 3 Drawing Sheets

500

```
┌─────────────────────────────────────────────────────────────────┐
│ Apply an adhesive to a first side of a plastic film to form an  │
│ adhesion member, the plastic film comprising the first side and │
│ a second side opposite of the first side                        │
│ 505                                                             │
└─────────────────────────────────────────────────────────────────┘
                              │
                              ▼
┌─────────────────────────────────────────────────────────────────┐
│ Connect the adhesion member to the display screen, the adhesive │
│ bonding the plastic film to a peripheral region of the display  │
│ screen                                                          │
│ 510                                                             │
└─────────────────────────────────────────────────────────────────┘
                              │
                              ▼
┌─────────────────────────────────────────────────────────────────┐
│ Insert the display screen with the connected adhesion member    │
│ into a housing mold                                             │
│ 515                                                             │
└─────────────────────────────────────────────────────────────────┘
                              │
                              ▼
┌─────────────────────────────────────────────────────────────────┐
│ Inject into the housing mold plastic resin to form a housing of │
│ an electronic device, the plastic film bonding with the         │
│ injected plastic resin to bond the plastic film to the housing  │
│ and securing the display screen into the housing                │
│ 520                                                             │
└─────────────────────────────────────────────────────────────────┘
```

FIG. 5

MOLDING A DISPLAY SCREEN INTO A HOUSING OF AN ELECTRONIC DEVICE

CROSS-REFERENCE TO RELATED APPLICATIONS

This application claims the benefit of application No. 61/836,464, filed on Jun. 18, 2013, which is fully incorporated herein by reference.

BACKGROUND OF THE INVENTION

Arrangements described herein relate to attaching a display screen to a housing of an electronic device.

Contemporary electronic devices oftentimes include a housing in which a display screen is mounted. Examples of such electronic devices include, but are not limited to, smart phones, tablet computers, portable music players, and the like. Oftentimes glue is used to attach the display screen to the housing to fix the display screen into the housing.

BRIEF DESCRIPTION OF THE DRAWINGS

FIG. 5 is a flowchart presenting a method of molding a display screen into a housing of electronic device, which is useful for understanding various arrangements described herein.

DETAILED DESCRIPTION

While the specification concludes with claims defining features of the embodiments described herein that are regarded as novel, it is believed that these embodiments will be better understood from a consideration of the description in conjunction with the drawings. As required, detailed arrangements of the present embodiments are disclosed herein; however, it is to be understood that the disclosed arrangements are merely exemplary of the embodiments, which can be embodied in various forms. Therefore, specific structural and functional details disclosed herein are not to be interpreted as limiting, but merely as a basis for the claims and as a representative basis for teaching one skilled in the art to variously employ the present embodiments in virtually any appropriately detailed structure. Further, the terms and phrases used herein are not intended to be limiting but rather to provide an understandable description of the present arrangements.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

Arrangements described herein relate to molding a display screen into a device housing (hereinafter "housing") of an electronic device. Oftentimes, a display screen is attached to a housing of an electronic device using glue. When the display screen is pressed into the housing, the glue typically spreads, sometimes extending into areas where it is not desired to have the glue present. For example, the glue sometimes may spread over an edge of a screen of the display screen so that the glue is externally visible on the electronic device. Generally speaking, it is undesirable for the glue to be externally visible. In lieu of glue, the present arrangements implement a die cut adhesive, over which a plastic film is disposed, to mold a display screen into a housing of an electronic device during a plastic injection molding process used to form the housing. The adhesive adheres to the display screen and the plastic film, and plastic film bonds to the housing during the molding process, thereby securing the display screen to the housing. Thus, the issue of glue spreading in an undesirable manner is circumvented.

Figure 1:
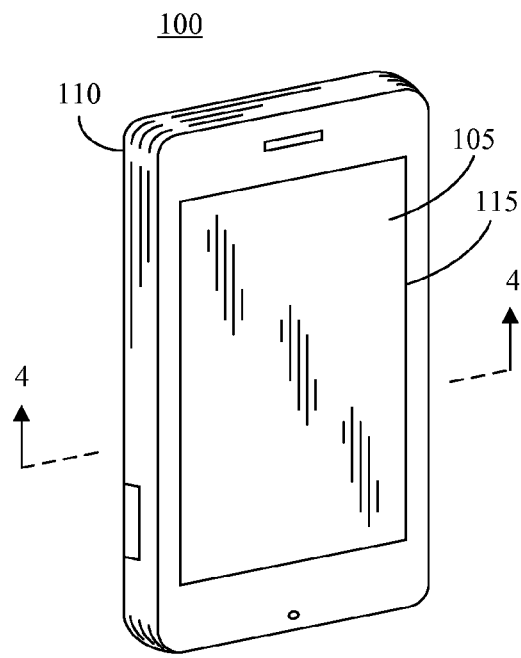
FIG. 1 depicts an electronic device including a display screen, which is useful for understanding various arrangements described herein.

FIG. 1 depicts an electronic device 100 including a display screen 105, which is useful for understanding various arrangements described herein. As used herein, the term "display screen" means a generally planar surface on which an image or a series of images are projected or reflected, or through which an image is transmitted. The display screen 105 can be molded into a housing 110 of the electronic device 100. More particularly, an aperture 115 can be defined in the housing 110, and the display screen 105 can be positioned within the aperture 115. Hereinafter the "display screen" may simply be referred to as "screen."

Figure 2:
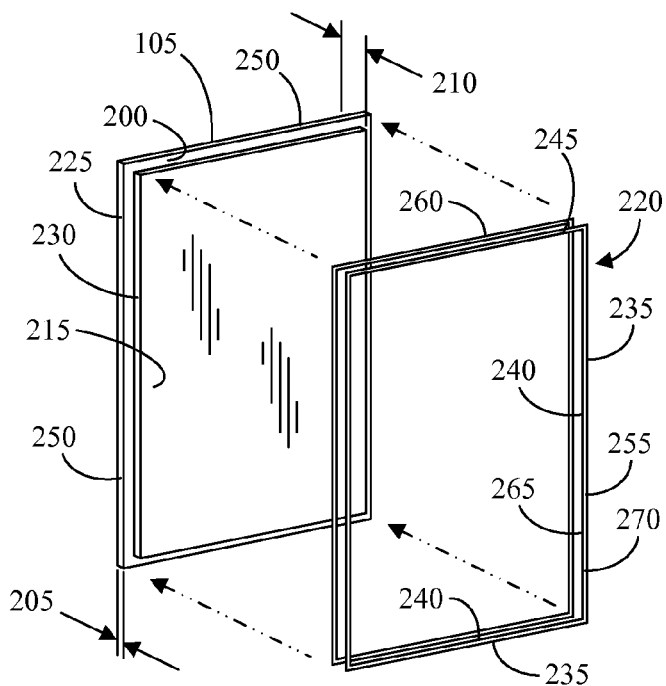
FIG. 2 depicts the display screen of FIG. 1, which is useful for understanding various arrangements described herein.

FIG. 2 depicts the display screen 105 of FIG. 1, which is useful for understanding various arrangements described herein. The display screen 105 can comprise a peripheral region 200 extending around the perimeter of the display screen 105. The thickness 205 of the display screen 105 at the peripheral region 200 can be less than the thickness 210 of the portion 215 of the display screen 105 that fits into the aperture 115 of FIG. 1. For example, the difference in thicknesses between the peripheral region 200 and the portion 215 of the display screen 105 can define a step feature. In one arrangement, the display screen 105 can comprise two or more screen layers 225, 230 bonded together using a suitable bonding agent. For example, the screen layer 230 can define the portion 215 of the display screen 105, and the peripheral dimensions of the screen layer 230 can be smaller than the peripheral dimensions of the screen layer 225, thereby exposing the peripheral region 200 on the screen layer 225.

An adhesion member 220 can be connected to the peripheral region 200 of the display screen 105. In this regard, the adhesion member 220 can be die cut to suitable dimensions to conform to (e.g., fit onto) the peripheral region 200. For example, if the display screen 105 is rectangular in shape, the adhesion member 220 also can be rectangular in shape, having outer edges 235 and inner edges 240 defining an aperture 245. The aperture 245 can be slightly larger than the portion 215 of the display screen 105 (e.g., the screen layer 230), thus allowing for the adhesion member 220 to fit flush against the peripheral region 200 of the display screen 105. The peripheral dimensions of the adhesion member 220 can be slightly smaller than the peripheral dimensions of the peripheral region 200 (e.g., smaller than the peripheral dimensions of the screen layer 225), thus avoiding overhang of the adhesion member 220 over the peripheral edges 250 of the display screen 105.

The adhesion member 220 can comprise a plastic film 255, such as polycarbonate film, having a first side 265 configured to face the display screen 105 and a second side 270 opposite the first side 265, the second side 270 configured to face away from the display screen 105. The adhesion member 220 also can comprise an adhesive 260 applied to the first side 265 of the plastic film 255. The adhesive 260 can bond the adhesion member 220 to the peripheral region 200 of the display screen 105. In one arrangement, the thickness of the plastic film, prior to the molding process forming the housing, can be between approximately 50 μm and 100 nm. The thickness of the adhesive 260, prior to the molding process, can be approximately 150 μm and 200 nm. The total thickness of the adhesion member 220, prior to the molding process, can be between approximately 200 μm and 300 nm.

The adhesive 260 can be selected to bond the plastic film 255 to the display screen 105, and maintain this bond during the housing molding process. In one arrangement, the adhesive 260 can be sprayed onto the plastic film 255, dispensed onto the plastic film 255, or applied to the plastic film 255 in another suitable manner. The adhesive 260 can be applied to the plastic film 255 before, after, or when the plastic film 255 is die cut. In another arrangement, the adhesive 260 can be an adhesive film or transfer tape attached to the plastic film 255. The adhesive film or transfer tape can be die cut with the plastic film 255 after being applied to the plastic film 255, or first can be die cut and then applied to the die cut plastic film 255. Further, the adhesive 260 can be a pressure sensitive adhesive, adhering the plastic film 255 to the display screen 105 when pressure is applied to mate the adhesion member 220 to the display screen 105. Examples of adhesive tape that can be used as the adhesive 260 include, but are not limited to, Model Nos. 57120B, 57120SB, 57320B and 57320SB available from Nitto Denko Corporation of Osaka, Japan.

The plastic film 255 can be a polycarbonate film selected to at least partially melt at the temperature used to mold the housing 110 from the plastic resin, for example between 150° C. and 350° C., thus bonding the plastic film 255 to the plastic resin when the plastic film 255 and plastic resin cool to a temperature sufficiently low enough for the plastic resin to harden and form the housing 110, for example below 125° C. By virtue of the plastic film 255 bonding to the housing 110 and the adhesive 260 bonding the plastic film 255 to the display screen 105, the adhesion member 220 secures the display screen 105 to the housing 110. Further, use of the plastic film 255 enables survival of the adhesive 260 during the molding process. Specifically, the plastic film 255 can provide a measure of thermal insulation between the plastic resin and the adhesive 260, thus limiting exposure of the adhesive 260 to high temperatures resulting from the molding process.

Figure 3:
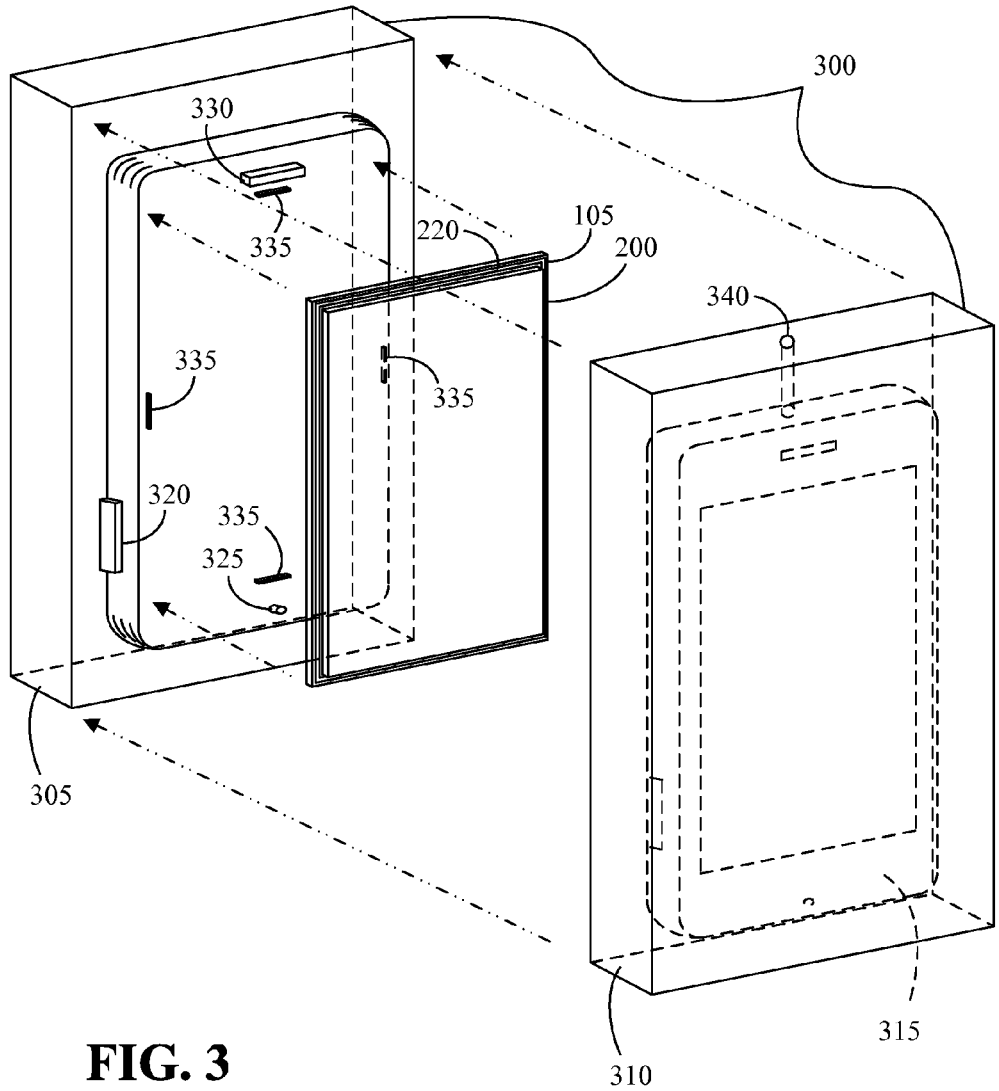
FIG. 3 depicts a housing mold, which is useful for understanding various arrangements described herein.

FIG. 3 depicts a housing mold 300, which is useful for understanding various arrangements described herein. The housing mold 300 can be configured to form the housing 110 of the electronic device 100 (shown in FIG. 1) from plastic resin, for example model no. UT-5025 resin available from Bayer MaterialScience of Pittsburgh, Pa. In another arrangement, the housing 110 can be formed from grade EXL1414 Lexan™ resin or grade EXL4019 Lexan™ resin, both available from Sabic Innovative Plastic Products of Pittsfield, Mass.

The mold 300 can comprise a first mold member 305 and a second mold member 310 configured to mate together, defining a cavity 315 to receive the plastic resin in an injection molding process. The cavity 315 and various features 320, 325, 330 can be configured in the mold to define the shape of the housing of the electronic device.

Prior to mating the first and second mold members 305, 310, the display screen 105, the side of the adhesion member 220 where the adhesive 260 is applied can be connected to the peripheral region 200 of the display screen 105, and the display screen 105 can be inserted into the housing mold 300. The housing mold 300 can include tabs 335, or other suitable features, to hold the display screen 105 into the proper position within the cavity 315 during the molding process. When the display screen 105 is in place, the first and second mold members 305, 310 can be mated, and plastic resin can be injected into the cavity 315 to form the housing. For example, the plastic resin can be injected through a duct 340 provided in the mold 300 that connects to the cavity 315.

Prior to being injected into the housing mold 300, the plastic resin can be heated to a temperature suitable to melt the plastic resin and enable the plastic resin to flow through the duct 340 into the cavity 315 and fill the cavity 315. For example, the plastic resin can be heated to a temperature between 150° C. and 350° C. The plastic resin can be allowed to cool and solidify to form the plastic housing before un-mating the mold members 305, 310 to remove the housing. At this point, the display screen 105 now connected to the housing via the adhesion member 220. Specifically, during the molding process, the plastic film (255 of FIG. 2) of the adhesion member 220 can bond to the injected plastic, securing the display screen 105 to the housing.

Figure 4:
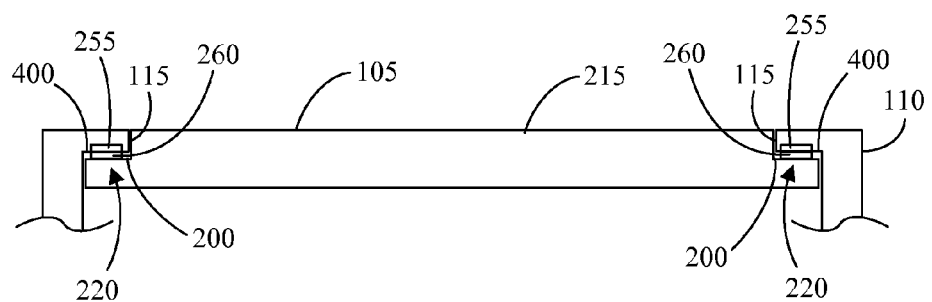
FIG. 4 depicts an enlarged section view of the electronic device FIG. 1, taken along section line 4-4, in accordance with one arrangement described herein

FIG. 4 depicts an enlarged section view of the electronic device FIG. 1, taken along section line 4-4, in accordance with one arrangement described herein. In FIG. 4, the display screen 105 has been connected to the housing 110 during a molding process, such as the molding process described with respect to FIG. 3. The portion 215 of the display screen 105 can fit into the aperture 115 of the housing 110. The peripheral region 200 of the display screen 105 can be bonded to an inner side 400 of the housing 110 via the adhesion member 220. Specifically, the plastic film 255 can be bonded to the side 400 of the housing 110, and the adhesive 260 can be adhered to the peripheral region 200 of the display screen 105.

Notably, in contrast to glue that typically is used to attach a display screen to a housing, the adhesion member 220 will not spread outside of the peripheral region 200 of the display screen 105. Glue, however, will sometimes spreads (or wash out) through a small gap between an aperture in the housing and the display screen, becoming externally visible on the electronic device. Glue also sometimes spreads into other places within an electronic device where it is not supposed to be. The present arrangements overcome these issues.

FIG. 5 is a flowchart presenting a method of molding a display screen into a housing of electronic device, which is useful for understanding various arrangements described herein. At step 505, an adhesive can be applied a first side of a plastic film to form an adhesion member, the plastic film comprising the first side and a second side opposite of the first side. At step 510, the adhesion member can be connected to a display screen, the adhesive bonding the plastic film to a peripheral region of the display screen. At step 515, the display screen with the connected adhesion member can be inserted into a housing mold. At step 520, plastic resin can be injected into the housing mold to form the housing of the electronic device, the plastic film bonding with the injected plastic resin to bond the plastic film to the housing and securing the display screen into the housing.

Like numbers have been used to refer to the same items throughout this specification. The terminology used herein is for the purpose of describing particular embodiments only and is not intended to be limiting of the invention. The terms "a" and "an," as used herein, are defined as one or more than one. The term "plurality," as used herein, is defined as two or more than two. The term "another," as used herein, is defined as at least a second or more. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

Reference throughout this specification to "one arrangement," "an arrangement," or similar language means that a particular feature, structure, or characteristic described in connection with the embodiment is included in at least one arrangement disclosed within this specification. Thus, appearances of the phrases "in one arrangement," "in an arrangement," and similar language throughout this specification may, but do not necessarily, all refer to the same arrangement.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

These embodiments can be embodied in other forms without departing from the spirit or essential attributes thereof. Accordingly, reference should be made to the following claims, rather than to the foregoing specification, as indicating the scope of the embodiments.

What is claimed is:

1. A method of molding a display screen into a housing of an electronic device, the method comprising:
    applying an adhesive to a first side of a plastic film to form an adhesion member, the plastic film comprising the first side and a second side opposite of the first side;
    connecting the adhesion member to the display screen, the adhesive bonding the plastic film to a peripheral region of the display screen;
    inserting the display screen with the connected adhesion member into a housing mold; and
    injecting plastic resin into the housing mold to form the housing, the plastic film bonding with the injected plastic resin to bond the plastic film to the housing and securing the display screen into the housing.

2. The method of claim 1, further comprising:
    die cutting the adhesion member to a shape that conforms to the peripheral region of the display screen after the adhesive is applied to the first side of the plastic film.

3. The method of claim 1, further comprising:
    die cutting the plastic film to a shape that conforms to the peripheral region of the display screen;
    wherein applying an adhesive to the first side of the plastic film to form the adhesion member comprises applying the adhesive to the first side of the die cut plastic film.

4. The method of claim 3, further comprising:
    die cutting the adhesive to the shape that conforms to the peripheral region of the display screen.

5. The method of claim 1, wherein applying the adhesive to the first side of the plastic film to form the adhesion member comprises spraying the adhesive onto the first side of the plastic film.

6. The method of claim 1, wherein applying the adhesive to the first side of the plastic film to form the adhesion member comprises dispensing the adhesive onto the first side of the plastic film.

7. The method of claim 1, wherein the plastic film is a polycarbonate film.

8. The method of claim 1, wherein:
    injecting the plastic resin into the housing mold comprises injecting the plastic resin at a temperature between 150° C. and 350° C.; and
    the plastic film at least partially melts at the temperature between 150° C. and 350° C., creating a bond between the plastic film and the housing when the plastic film and plastic resin cool to a temperature where the plastic resin is hardened to form the housing.

9. An electronic device, comprising:
    a device housing;
    an adhesion member comprising:
        a plastic film comprising a first side and a second side opposite of the first side; and
        an adhesive applied to the first side of the plastic film;
    a display screen molded into an aperture of the device housing during a plastic injection molding process forming the device housing from plastic resin injected into a housing mold, the adhesive applied to the first side of the plastic film bonding the plastic film to a peripheral region of the display screen, and the plastic film bonding with the injected plastic resin to bond the plastic film to the device housing and secure the display screen into the device housing.

10. The electronic device of claim 9, wherein the adhesion member is die cut to a shape that conforms to the peripheral region of the display screen after the adhesive is applied to the first side of the plastic film.

11. The electronic device of claim 9, wherein the plastic film is die cut to a shape that conforms to the peripheral region of the display screen, and the adhesive is applied to the first side of the die cut plastic film.

12. The electronic device of claim 11, wherein the adhesive is die cut to the shape that conforms to the peripheral region of the display screen.

13. The electronic device of claim 9, wherein the adhesive is sprayed onto the first side of the plastic film.

14. The electronic device of claim 9, wherein the adhesive is dispensed onto the first side of the plastic film.

15. The electronic device of claim 9, wherein the plastic film is a polycarbonate film.

16. The electronic device of claim 9, wherein:
    the plastic resin is injected into the housing mold at a temperature between 150° C. and 350° C.; and
    the plastic film at least partially melts at the temperature between 150° C. and 350° C., creating a bond between the plastic film and the device housing when the plastic film and plastic resin cool to a temperature where the plastic resin is hardened to form the device housing.

* * * * *